(12) United States Patent
Shin et al.

(10) Patent No.: US 10,954,165 B2
(45) Date of Patent: Mar. 23, 2021

(54) POLYCRYSTALLINE CUBIC BORON NITRIDE AND METHOD FOR PREPARING SAME

(71) Applicant: ILJIN DIAMOND CO., LTD., Eumseong (KR)

(72) Inventors: Dong Kyun Shin, Eumseong (KR); Hee Sub Park, Eumseong (KR)

(73) Assignee: ILJIN DIAMOND CO., LTD., Eumsong (KR)

( * ) Notice: Subject to any disclaimer, the term of this patent is extended or adjusted under 35 U.S.C. 154(b) by 128 days.

(21) Appl. No.: 16/092,385

(22) PCT Filed: Mar. 21, 2017

(86) PCT No.: PCT/KR2017/002984
§ 371 (c)(1),
(2) Date: Oct. 9, 2018

(87) PCT Pub. No.: WO2017/179828
PCT Pub. Date: Oct. 19, 2017

(65) Prior Publication Data
US 2019/0071360 A1   Mar. 7, 2019

(30) Foreign Application Priority Data

Apr. 11, 2016  (KR) .................. 10-2016-0044278

(51) Int. Cl.
*C04B 35/5831*  (2006.01)
*C09K 3/14*  (2006.01)
(Continued)

(52) U.S. Cl.
CPC ............. *C04B 35/5831* (2013.01); *B01J 6/00* (2013.01); *B23B 27/148* (2013.01);
(Continued)

(58) Field of Classification Search
CPC .............. C04B 35/5831; C04B 35/624; C04B 35/6261; C04B 35/62665; C04B 35/6303;
(Continued)

(56) References Cited

U.S. PATENT DOCUMENTS

2009/0169840 A1   7/2009  Okamura et al.
2012/0230786 A1*  9/2012  Matsuda ............. C04B 35/5831
                                                                    407/119

FOREIGN PATENT DOCUMENTS

JP    05-301776 A    11/1993
JP    10-218666 A    8/1998
(Continued)

*Primary Examiner* — Pegah Parvini
(74) *Attorney, Agent, or Firm* — Patent Office of Dr. Chung Park

(57) ABSTRACT

The present disclosure relates to polycrystalline cubic boron nitride (PCBN) with enhanced impact-resistance and wear-resistance and a method for producing the PCBN. According to the present disclosure, producing the polycrystalline cubic boron nitride with one or more kinds of protrusion-shaped borides formed on the cubic boron nitride surface may inhibits the development of cracks along the surfaces of the cubic boron nitride particles and binders, thereby to improve the impact-resistance and wear-resistance. In this way, the life-span of the machining tools may be enhanced. Further, the polycrystalline cubic boron nitride may have at least one kind of a compound composed of at least two selected from the group consisting of BN, Ti, W, Co, Zr, and Si as formed during sintering. This may allow the PCBN to have high bonding strength between the cubic boron nitride and the binder.

4 Claims, 4 Drawing Sheets

(51) Int. Cl.
*C01B 21/064* (2006.01)
*B01J 6/00* (2006.01)
*B23B 27/14* (2006.01)
*C04B 35/624* (2006.01)
*C04B 35/626* (2006.01)
*C04B 35/63* (2006.01)
*C04B 35/64* (2006.01)

(52) U.S. Cl.
CPC .......... *C01B 21/064* (2013.01); *C04B 35/624* (2013.01); *C04B 35/6261* (2013.01); *C04B 35/6265* (2013.01); *C04B 35/62665* (2013.01); *C04B 35/6303* (2013.01); *C04B 35/6316* (2013.01); *C04B 35/64* (2013.01); *C09K 3/14* (2013.01); *B23B 2226/125* (2013.01); *C04B 2235/386* (2013.01); *C04B 2235/5436* (2013.01); *C04B 2235/602* (2013.01); *C04B 2235/656* (2013.01); *C04B 2235/6581* (2013.01); *C04B 2235/6584* (2013.01); *C04B 2235/96* (2013.01)

(58) Field of Classification Search
CPC ................ C04B 35/6316; C04B 35/64; C04B 2235/386; C04B 2235/5436; C04B 2235/656; B24B 27/148; B24B 27/125; B01J 6/00; C09K 3/14
See application file for complete search history.

(56) References Cited

FOREIGN PATENT DOCUMENTS

| | | |
|---|---|---|
| JP | 3461054 B2 | 10/2003 |
| JP | 2006-347850 A | 12/2006 |
| JP | 2009-067637 A | 4/2009 |
| KR | 10-2007-0090238 A | 9/2007 |
| KR | 10-2009-0133110 A | 12/2009 |
| KR | 10-2012-0099249 A | 9/2012 |
| WO | 2012/053507 A1 | 4/2012 |
| WO | 2016/084929 | 6/2016 |

* cited by examiner

POLYCRYSTALLINE CUBIC BORON NITRIDE AND METHOD FOR PREPARING SAME

BACKGROUND

1. Field

The present disclosure relates to polycrystalline cubic boron nitride (PCBN) and a method for producing the PCBN. More particularly, the present disclosure relates to polycrystalline cubic boron nitride with excellent impact-resistance and wear-resistance and a method for producing the PCBN.

2. Description of Related Art

With the advancement of industrial technology, it is required to improve the precision, performance and durability of cutting tools, dies or precision element mechanical parts. There is a growing demand for high-precision finish machining of high-hardness iron-based materials of various molding dies and sliding parts. Monocrystalline diamond and single crystal cubic boron nitride have been studied as precise processing elements for these iron-based materials.

However, when cutting the iron-based material with the single crystal diamond, the chemical reaction between diamond and iron takes place via cutting heat. Thus, there occurs a problem that the diamond tool wears rapidly. Thus, it is impossible to directly process a metal mold made of a steel using the single crystal diamond. For this reason, for example, in the precision machining of a lens mold, electroless nickel plating is performed. Then, precisely finishing the plated layer has been adopted. However, when using this approach, the strength of the mold is insufficient and the process is complicated. In addition, direct machining has been studied by a chemical reaction suppression method using a special atmosphere. However, this may not be practical.

In general, boron nitride is typically present in following three crystal forms: cubic boron nitride (CBN), hexagonal boron nitride (hBN) and wurtztic boron nitride (wBN). Among them, the cubic boron nitride (CBN) is a hard zinc blend type of boron nitride having a structure similar to diamond. The bond formed between atoms in the cubic boron nitride structure is strong. These bonds are mainly tetrahedral shared bonds.

Further, cubic boron nitride (CBN) is the second hardest substance after diamond. Unlike diamonds, the CBN does not react with iron-based metals at high temperatures, and the CBN can be synthesized at low temperatures. The CBN is not oxidized even at a high temperature of about 1300 DEG C. The CBN is advantageously used as a surface coating material of a cutting tool. When grinding the iron-based material using the CBN based cutting tool, the CBN is excellent in chemical stability, has a high heat transfer rate, and is not easily worn by grinding heat. Thus, the grinding blade made of CBN is well maintained. As a result, CBN is widely used in machining of iron-based metals such as high-hardness heat-treated steel, tool steel, and cast iron.

The cubic boron nitride may be used in a form of polycrystalline cubic boron nitride (PCBN). Because diamond has the property of being oxidized with iron-based metals, polycrystalline cubic boron nitride is mainly used for machining of iron-based metals that cannot be machined with diamond. The PCBN is mostly used for cutting machining of the cast iron such as automobiles and various machine parts.

The polycrystalline cubic boron nitride (PCBN) may be prepared by mixing the cubic boron nitride (CBN) with a special ceramic material as a binder to form a mixture and then sintering the mixture. Recently, polycrystalline cubic boron nitride-based tools have been widely applied to difficult-to-cut workpieces such as high hardness heat treated steels, super heat resistant alloys and sintered metals. The polycrystalline cubic boron nitride-based tool that allows high-precision machining of the hardened materials may be an alternative to conventional grinding machining tools.

However, in the conventional polycrystalline cubic boron nitride, thermal cracking is likely to occur due to the severe load from the thermal cycle as occurring during the cutting process. The strength of the PCBN is lowered at the high temperature. Thus, it is impossible to obtain a sharp blade tip necessary for a precision cutting tool by using the PCBN. Thus, the life of the tool is not excellent. Therefore, there is an urgent need to study a cutting machining tool having excellent impact resistance and wear resistance.

DISCLOSURE OF THE INVENTION

Technical Purpose

The present disclosure is intended to provide polycrystalline cubic boron nitride with improved impact resistance and wear resistance by fabricating polycrystalline cubic boron nitride with one or more kinds of protrusion-shaped borides on the cubic boron nitride surface.

Further, the present disclosure is intended to provide polycrystalline cubic boron nitride having at least one kind of a compound between at least two selected from the group consisting of BN, Ti, W, Co, Zr, and Si as formed during sintering, thereby having high bonding strength between the cubic boron nitride and the binder.

Technical Solution

In one aspect of the present disclosure, there is provided a polycrystalline cubic boron nitride (PCBN) containing cubic boron nitride (CBN) particles and a binder, wherein a protrusion-shaped boride is formed on a surface of the cubic boron nitride particle, wherein an average particle size of the cubic boron nitride particles is in a range of 4 to 8 μm, wherein a volume of the cubic boron nitride particles is in a range of 70 to 85 vol %, wherein the boride protrusion is present within 100 nm of a distance from a surface of the cubic boron nitride particle, wherein the boride protrusion has a size of 0.001 to 1 μm.

In one embodiment of the PCBN, the binder contains: a first binder including at least one of nitride, carbide, carbonitride, oxide and boride of Ti, Co, Ni, Cu, W and Zr; and a second binder including at least one of nitride, carbide, carbonitride, oxide, and boride of Al, Cr, Si, Ta, and Nb.

In one embodiment of the PCBN, the polycrystalline cubic boron nitride contains at least one kind of a compound composed of at least two selected from a group consisting of BN, Ti, W, Co, Zr, and Si, wherein the compound is formed during sintering.

In another aspect of the present disclosure, there is provided a method for producing polycrystalline cubic boron nitride (PCBN), wherein the method comprises: a first step of performing a surface treatment of cubic boron nitride particles to remove foreign substances from the surfaces of the cubic boron nitride particles; a second step of mixing the surface-treated cubic boron nitride particles with binders to form mixed powders; a third step of shaping the mixed powders; and a fourth step of sintering the shaped mixed powders.

In one embodiment of the method, the method further comprises: a step of performing a surface treatment of binders to remove foreign substances from the surfaces of the binders.

In one embodiment of the method, the method further comprises: a step of performing a thermal treatment process of the mixed powders formed after mixing the surface treated cubic boron nitride particles with the binders.

In one embodiment of the method, the surface treatment of the cubic boron nitride particles is performed by at least one of a plasma surface treatment, a thermal treatment, an acid treatment, a sputtering, and a sol-gel method.

In one embodiment of the method, the surface treatment of the binders is carried out by at least one of a reduction and thermal treatment process, a plasma surface treatment, a sputtering, a plating and a sol-gel method.

In one embodiment of the method, the cubic boron nitride particles and binders are mixed with each other by one of ball mill, attritor mill, and planetary mill methods.

In one embodiment of the method, the thermal treatment process is performed at a temperature of 600° C. or higher in an atmosphere of one of vacuum, nitrogen, argon, and hydrogen, after mixing the cubic boron nitride particles and binders with each other.

In one embodiment of the method, the sintering is performed at a pressure of 3.5 to 6.5 GPa and a temperature of 1250° C. to 1650° C.

Technical Effects

According to the present disclosure, producing the polycrystalline cubic boron nitride with one or more kinds of protrusion-shaped borides formed on the cubic boron nitride surface may inhibits the development of cracks along the surfaces of the cubic boron nitride particles and binders, thereby to improve the impact-resistance and wear-resistance. In this way, the life-span of the machining tools may be enhanced.

Further, the polycrystalline cubic boron nitride may have at least one kind of a compound composed of at least two selected from the group consisting of BN, Ti, W, Co, Zr, and Si as formed during sintering. This may allow the PCBN to have high bonding strength between cubic boron nitride and the binder.

DETAILED DESCRIPTIONS

Figure 1:
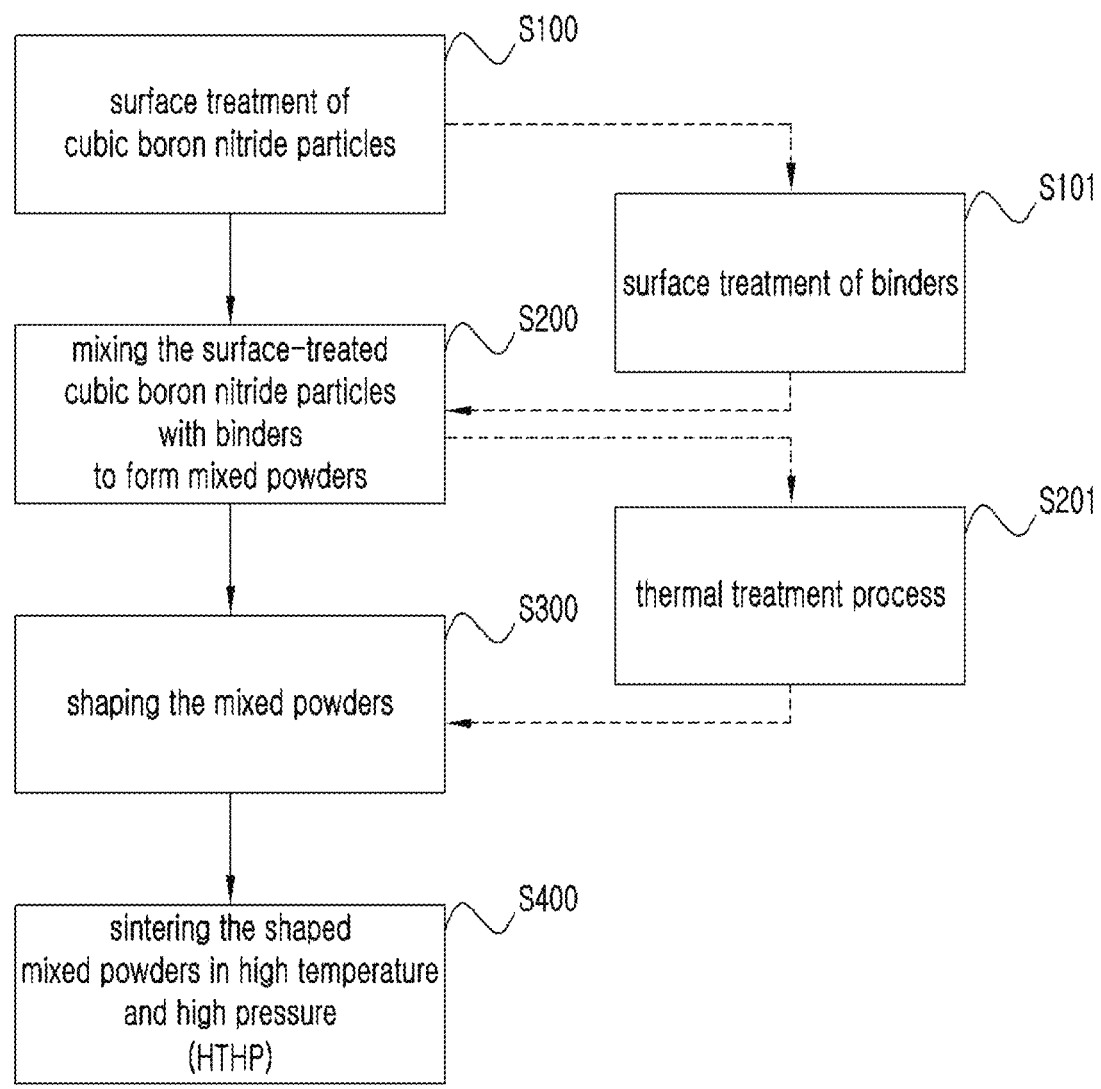
FIG. 1 is a flow chart illustrating a method for producing polycrystalline cubic boron nitride according to an embodiment of the present disclosure.

The details of other embodiments are included in the detailed description and drawings.

The advantages and features of the present disclosure, and how to accomplish them, will become apparent with reference to the embodiments described in detail below with reference to the accompanying drawings. However, the present disclosure is not limited to the embodiments disclosed below but may be implemented in various other forms. In the following description, when a certain portion is connected to another portion, this includes not only the case where they are directly connected but also the case where they are connected via another medium therebetween. Further, parts of the drawing that do not relate to the present disclosure have been omitted to clarify the description of the present disclosure. Like parts are designated with like reference numerals throughout the specification.

Hereinafter, the present disclosure will be described in detail.

1. Method for Producing Polycrystalline Cubic Boron Nitride

The following describes a method for producing polycrystalline cubic boron nitride according to the present disclosure. FIG. 1 is a flowchart showing the method for producing polycrystalline cubic boron nitride according to an embodiment of the present disclosure.

A method for producing a polycrystalline cubic boron nitride according to the present invention includes a first step S100 of treating a surface to remove foreign substances from a cubic boron nitride surface, a second step S200 of mixing the surface-treated cubic boron nitride and a binder to form mixed powders, a third step S300 of shaping the mixed powders, and a fourth step of sintering the shaped mixed powders S400.

The first step S100 is a step for removing foreign substances from the surface by surface treatment of cubic boron nitride. Surface treatment of the cubic boron nitride is preferably performed using plasma surface treatment, thermal treatment, acid treatment, sputtering, and sol-gel method. However, the surface treatment method of the cubic boron nitride (CBN) is not necessarily limited thereto. A method commonly used in this art may selectively be used.

The surface treatment may use two or more processes simultaneously without using a single process, based on the presence or absence of the foreign substance on the cubic boron nitride surface. In this way, treating the surface of the cubic boron nitride before the mixing process between the cubic boron nitride and the binder may increase the bonding probability between the cubic boron nitride and binder. Thereby, the protrusion-shaped boride or nitride may be locally formed on the cubic boron nitride surface in a reliable degree. Forming the protrusion-shaped boride on the surface via the surface treatment of the cubic boron nitride may suppress the propagation of the crack as much as possible. This may increase the life-span of the machining tool.

Next, after the surface treatment of the cubic boron nitride, the second step (S200) of mixing the CBN particles with the binder to form mixed powders is performed. In this connection, a process may be added to perform a surface treatment (S101) of the binder particle before mixing with the cubic boron nitride and the binder. The surface treatment of the binder may also be performed to remove the oxide or nitride from the binder surface.

The surface treatment of the binder is preferably performed using a reduction and thermal treatment process, a plasma surface treatment, a sputtering, a plating, and a sol-gel method/However, the surface treatment method of the binder is not necessarily limited thereto. Methods commonly used in the art may selectively be employed. The reduction thermal treatment process may be a surface treatment method to remove oxides and nitrides from the binder surface to increase the direct bonding force between cubic boron nitride and the binder. The plasma surface treatment and sputtering, plating and sol-gel method may be surface treatment methods used to remove the foreign substances from the binders. The surface treatment of the binder is preferably carried out using one or more processes without using only one process depending on the situation. That is, the binder is surface-treated to remove the oxides and nitrides from the binder surface before mixing the cubic boron nitride with the binder. Thus, when bonding the cubic boron nitride with the binder, the boride or nitride formation may easily occur.

In the second step S200, the mixing of the cubic boron nitride and the binder is performed by a general powder mixing method such as a ball mill, an attritor mill, a planetary mill method, or the like. Thus, a uniform mixing of the powders is carried out. The mixing of the cubic boron nitride particles with the binder is preferably carried out using any one of the above methods. However, the mixing method between the cubic boron nitride and the binder is not limited thereto. Methods commonly known in the art may also be used selectively.

The average particle size of the binder used in mixing the cubic boron nitride with the binder may be 0.001 to 1 μm.

The mixed powders between the cubic boron nitride and binder as mixed via the second step S200 are subjected to a thermal treatment process S201 before the shaping step. The thermal treatment process S201 may perform the thermal treatment of the mixed powders at a temperature of 600° C. or higher in a vacuum or a nitrogen, argon or hydrogen atmosphere.

Next, a step S300 of shaping the mixed powders is performed. In this step, the mixed powders as mixed through the second step S200 or the mixed powders subjected to the thermal treatment process are crushed and shaped into a circular disc shape. Any shaping method of the mixed powders may be selectively used as long as it is a method known in the art.

Thereafter, the fourth step S400 of sintering the mixed powders subjected to the shaping step S300 is performed. In the fourth step S400, the polycrystalline cubic boron nitride (PCBN) is produced by sintering the mixed powders at high temperature and high pressure of 1250° C. to 1650° C. and 3.5 to 6.5 GPa. Any sintering method may be selectively used in a manner known in the art.

According to the present disclosure for producing the polycrystalline cubic boron nitride, the surface treatment of each of the CBN and the binder before mixing between the cubic boron nitride and the binder may allow the protrusion-shaped boride to be easily formed locally on the cubic boron nitride surface. The formed boride is not a separately injected boride at the time of mixing the cubic boron nitride and the binder. Rather, the formed boride may be a boride as produced by the reaction between boron as an element in the cubic boron nitride particle, and the binder. The protrusion-shaped boride may be locally formed on the cubic boron nitride surface via the surface treatment of each of the cubic boron nitride and the binder before the mixing therebetween.

According to the method for producing polycrystalline cubic boron nitride according to the present disclosure, the boride formed locally on the cubic boron nitride surface may minimize the development of cracks along the surfaces of the cubic boron nitride particles and the binder, thereby increasing the life-span of the machining tool. As in the conventional method, when the boride is coated to a certain thickness along and on the periphery of the cubic boron nitride, the free movement of the crack is possible, which reduces the life-span of the machining tool. Thus, in accordance with the present disclosure, the surface treatment of each of CBN and the binder is performed prior to the mixing between the cubic boron nitride and the binder may not only allow increasing the bonding force between the cubic boron nitride and the binder, but also allow the protrusion-shaped boride to be formed locally on the cubic boron nitride surface.

The boride is not formed continuously along and on the periphery of the cubic boron nitride. The boride has a covalent bond with the cubic boron nitride particles. Alternatively, at least one boron projection is present within a distance of 100 nm from the surface of the CBN particle. The protrusion size of the boride is characterized by being in a range of from 0.001 to 1 μm. The properties of the polycrystalline cubic boron nitride (PCBN) as produced using the method for producing the polycrystalline cubic boron nitride according to the present disclosure will be described in detail below.

Figure 2:
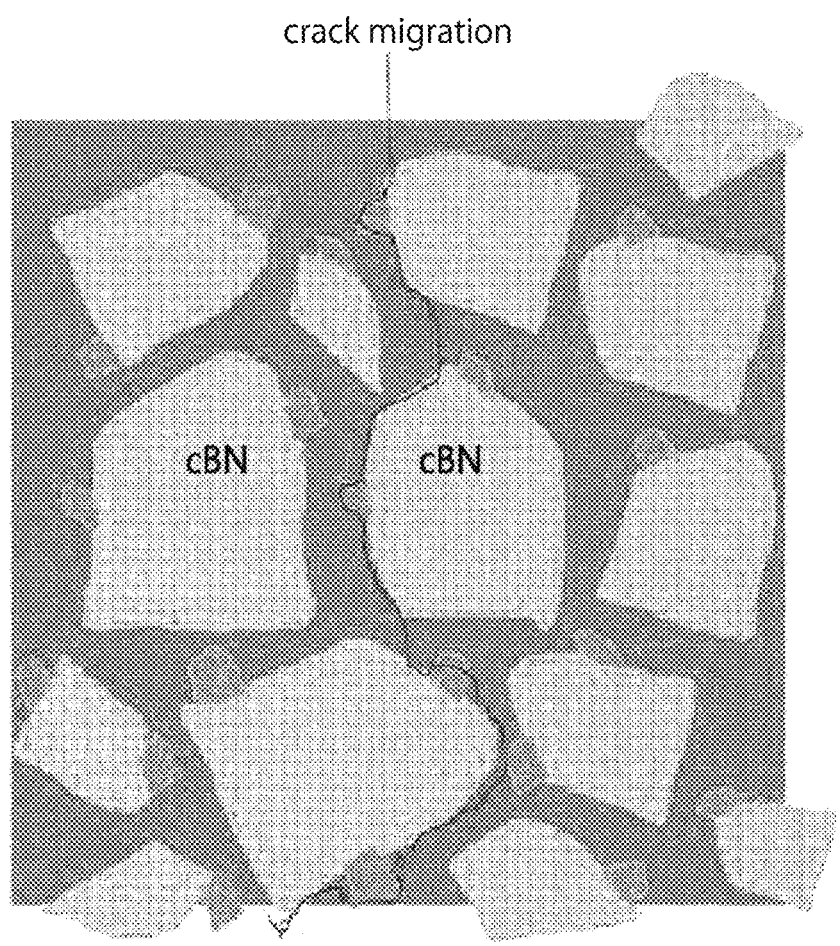
FIG. 2 is a schematic representation of a polycrystalline cubic boron nitride according to one embodiment of the present disclosure.
Figure 3:
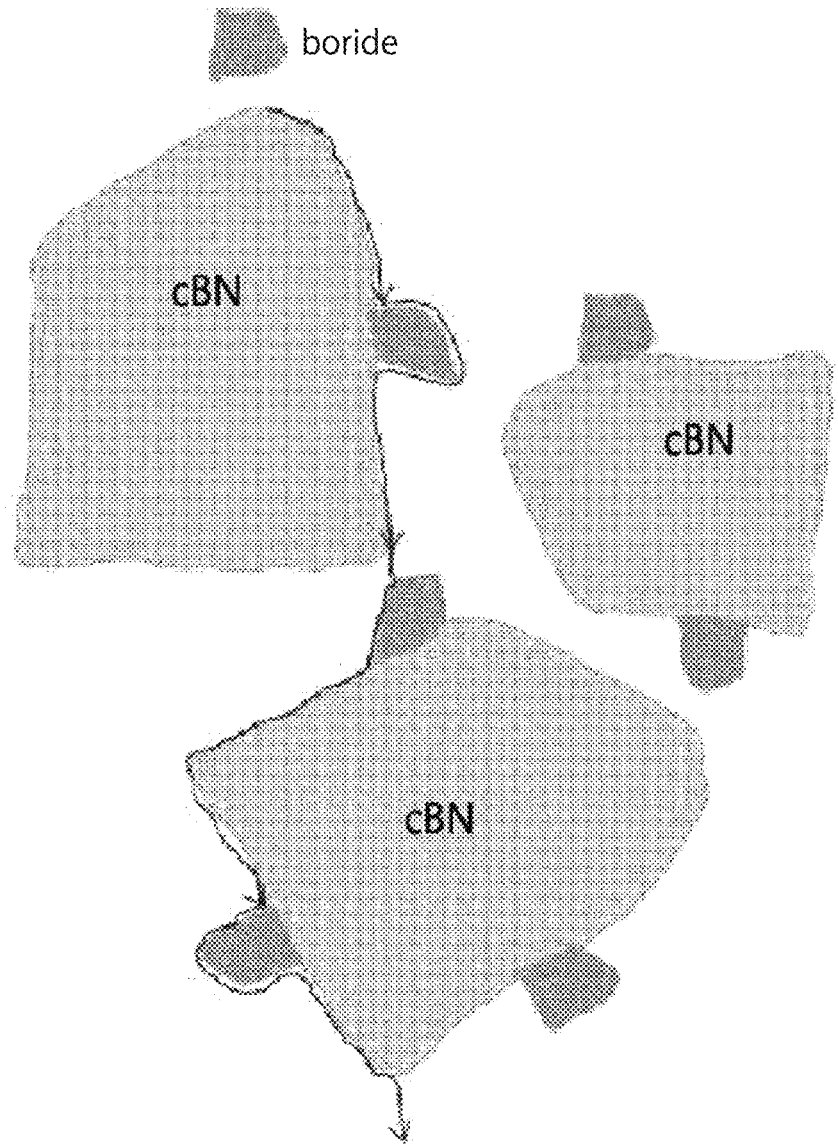
FIG. 3 is a schematic representation of a concept that a protrusion-shaped boride is locally formed on a polycrystalline cubic boron nitride particle surface, and that crack migration occurs, according to one embodiment of the present disclosure.
Figure 4:
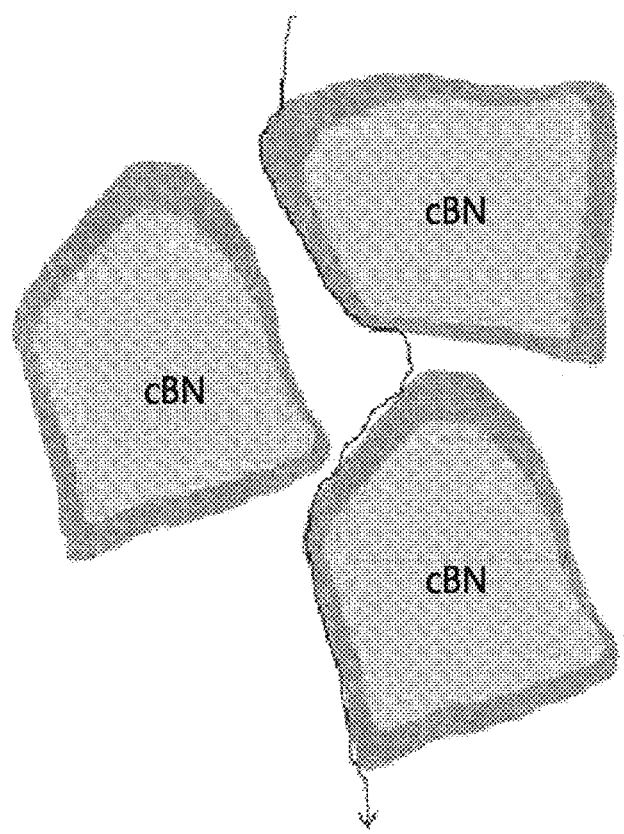
FIG. 4 is a schematic diagram of a concept of crack propagation when boride is coated on the cubic boron nitride particle surface with a certain thickness.

Properties of the Polycrystalline Cubic Boron Nitride (PCBN) as Produced Using the Method for Producing the Polycrystalline Cubic Boron Nitride According to the Present Disclosure First, referring to FIG. 2 to FIG. 4, polycrystalline cubic boron nitride according to one embodiment of the present disclosure will be described in more detail. FIG. 2 is a schematic representation of a polycrystalline cubic boron nitride according to one embodiment of the present disclosure. Further, FIG. 3 is a schematic diagram of a concept of the formation of the protrusion-shaped boride on the polycrystalline cubic boron nitride surface according to one embodiment of the present disclosure and the occurrence of crack migration therein. For reference, the arrow in FIG. 3 shows the movement of the crack.

The present disclosure provides polycrystalline cubic boron nitride including cubic boron nitride and a binder. In polycrystalline cubic boron nitride, a protrusion-shaped boride is formed on the cubic boron nitride surface. Referring to FIG. 2 and FIG. 3, the boride exists as a protrusion on a cubic boron nitride surface. The boride may not continuously surround the cubic boron nitride surface. Rather, the boride protrusions may be irregularly partially present on the cubic boron nitride surface. The boride is not formed continuously along and on the periphery of the cubic boron nitride. The boride has a covalent bond with the cubic boron nitride particles. Alternatively, at least one boron projection is present within a distance of 100 nm from the surface of the CBN particle. The protrusion size of the boride is characterized by being in a range of from 0.001 to 1 μm. Since the boride protrusions may be irregularly partially present on the cubic boron nitride surface, the development of the cracks along the surfaces of the cubic boron nitride particles and the binder is suppressed as much as possible, thereby increasing the life-span of the machining tool.

As in the conventional method, when the boride or nitride is coated to a certain thickness along and on the periphery of the cubic boron nitride, the free movement of the crack is possible, which reduces the life-span of the machining tool. To the contrary, in accordance with the present disclosure, the surface treatment of each of CBN and the binder is performed prior to the mixing between the cubic boron nitride and the binder may not only allow increasing the bonding force between the cubic boron nitride and the binder, but also allow the protrusion-shaped boride to be formed locally on the cubic boron nitride surface. Thus, the boride protrusions may be irregularly partially present on the cubic boron nitride surface, the development and migration of the cracks along the surfaces of the cubic boron nitride particles and the binder is suppressed as much as possible, thereby increasing the life-span of the machining tool. FIG. 4 is a schematic diagram of the concept of crack migration when boride is continuously coated on the cubic boron nitride surface with a certain thickness. For reference, the arrow in FIG. 4 indicates the movement of the crack. In FIG. 4, it may be seen that the crack migration is relatively free due to the boride being coated on the cubic boron nitride surface to a certain extent. To the contrary, as shown in FIG. 3, in accordance with the present disclosure, the protrusion-shaped boride is locally formed on the cubic boron nitride surface, such that the movement of the crack may be suppressed as much as possible. When the crack propagation is suppressed as described above, the impact resistance and wear resistance of the machining tool are improved, thereby to prolong the life-span of the machining tools.

The formed boride is not a separately injected boride at the time of mixing the cubic boron nitride and the binder. Rather, the formed boride may be a boride as produced by the reaction between boron as an element in the cubic boron nitride particle, and the binder.

When the boride is introduced at the initial stage of mixing the cubic boron nitride and the binder, the boride is present at a distance of 100 nm or larger from the boundary of cubic boron nitride particles. When the boride is present at a distance of 100 nm or larger from the cubic boron nitride, the boride may become an impurity in the binder such that the bonding force may be lowered, which is undesirable. Therefore, as in the present disclosure, the boride is not injected at the initial stage of mixing the cubic boron nitride and the binder. Rather, the boride may be formed via the reaction during the sintering.

Further, before the mixing of the cubic boron nitride and the binder according to the present disclosure, the CBB surface treatment step is performed. Thus, the bonding force between the cubic boron nitride and the binder is increased via the surface treatment step, thereby facilitating the local formation of the boride of the protrusion shape. Further, the binder to be mixed with cubic boron nitride is also subjected to a surface treatment process.

Surface treatment of the cubic boron nitride is preferably performed using plasma surface treatment, thermal treatment, acid treatment, sputtering, and sol-gel method. However, the surface treatment method of the cubic boron nitride (CBN) is not necessarily limited thereto. A method commonly used in this art may selectively be used. The surface treatment may use two or more processes simultaneously without using a single process, based on the presence or absence of the foreign substance on the cubic boron nitride surface.

Further, the surface treatment of the binder is preferably performed using a reduction and thermal treatment process, a plasma surface treatment, a sputtering, a plating, and a sol-gel method/However, the surface treatment method of the binder is not necessarily limited thereto. Methods commonly used in the art may selectively be employed. The reduction thermal treatment process may be a surface treatment method to remove oxides and nitrides from the binder surface to increase the direct bonding force between cubic boron nitride and the binder. The plasma surface treatment and sputtering, plating and sol-gel method may be surface treatment methods used to remove the foreign substances from the binders and improve the purity of the binder. The surface treatment of the binder is preferably carried out using one or more processes without using only one process depending on the situation.

Then, the mixing of the cubic boron nitride and the binder is performed by a general powder mixing method such as a ball mill, an attritor mill, a planetary mill method, or the like. Thus, a uniform mixing of the powders is carried out. The mixing of the cubic boron nitride particles with the binder is preferably carried out using any one of the above methods. However, the mixing method between the cubic boron nitride and the binder is not limited thereto. Methods commonly known in the art may also be used selectively. The average particle size of the binder used in mixing the cubic boron nitride with the binder may be 0.001 to 1 μm. The mixed powders between the cubic boron nitride and binder as mixed via the mixing step are subjected to the thermal treatment process before the shaping step. The thermal treatment process may perform the thermal treatment of the mixed powders at a temperature of 600° C. or higher in a vacuum or a nitrogen, argon or hydrogen atmosphere. Then, the mixed powders subjected to the thermal treatment process are crushed and shaped into a circular disc shape. Any shaping method of the mixed powders may be selectively used as long as it is a method known in the art. Thereafter, the polycrystalline cubic boron nitride (PCBN) is produced by sintering the mixed powders at high temperature and high pressure of 1250° C. to 1650° C. and 3.5 to 6.5 GPa.

In one embodiment, an average particle size of the cubic boron nitride particles is in a range of 4 to 8 μm. A volume of the cubic boron nitride particles is in a range of 70 to 85 vol %. When the average value of cubic boron nitride particle size is smaller than 4 μm, the disappearance of the particles of the cubic boron nitride and the variation of the particle size in the reaction between the cubic boron nitride and the binder may negatively affect the life-span of the machining tool. Further, when the average value of cubic boron nitride particle size exceeds 8 μm, the possibility of direct bonding between cubic boron nitride particles increases, which is not desirable.

Further, when the volume of cubic boron nitride is smaller than 70 vol %, the cracks are free to move, and, hence, the effect of inhibiting crack propagation by the boride formed on the cubic boron nitride surface is lowered. This is undesirable. When the volume of the cubic boron nitride exceeds 85 vol %, the possibility of the direct bond between the cubic boron nitride particles increases. As the probability of direct bond between cubic boron nitride particles increases, the hardness increases whereas impact on the machining tools increases the frequency of breakage thereof, which in turn has a negative impact on the life-span of the machining tool.

In one embodiment, the polycrystalline cubic boron nitride may have at least one kind of a compound composed of at least two selected from the group consisting of BN, Ti, W, Co, Zr, and Si as formed during sintering. This may allow the PCBN to have high bonding strength between the cubic boron nitride and the binder.

In one embodiment, the binder contains: a first binder including at least one of nitride, carbide, carbonitride, oxide and boride of Ti, Co, Ni, Cu, W and Zr; and a second binder including at least one of nitride, carbide, carbonitride, oxide, and boride of Al, Cr, Si, Ta, and Nb. Since the binder component including the first binder and the binder component including the second binder are present in the polycrystalline cubic boron nitride, the polycrystalline cubic boron nitride according to the present disclosure may have adequate electrical conductivity. A composite sintered body having an appropriate electrical conductivity has an effect of facilitating the EDM discharge workability and facilitating cutting in the cutting process.

Those of ordinary skill in the art to which the present disclosure belongs may understand that the present disclosure may be embodied in other specific forms without departing from the spirit or essential characteristics thereof. It is therefore to be understood that the above-described embodiments are illustrative in all aspects and not restrictive. The scope of the present disclosure is defined by the claims set forth below rather than by the above detailed description. All changes or modifications that come within the meaning and range of the claims and the equivalents thereof are to be construed as being included within the scope of the present disclosure.

What is claimed is:

1. A polycrystalline cubic boron nitride (PCBN), comprising:
   cubic boron nitride (CBN) particles and a binder, wherein at least one protrusion-shaped boride is formed on a surface of each of the cubic boron nitride particles and wherein the at least one protrusion-shaped boride originates from the cubic boron nitride particles;
   wherein an average particle size of the cubic boron nitride particles is in a range of 4 to 8 µm,
   wherein a volume of the cubic boron nitride particles is in a range of 70 vol % or higher and less than 82 vol %,
   wherein the at least one protrusion-shaped boride is present within 100 nm from the surface of each said cubic boron nitride particle, wherein the at least one protrusion-shaped boride has a size of 0.001 to 1 µm, and
   wherein the binder contains:
   a first binder including at least one of nitride, carbide, carbonitride, oxide and boride of Ti, Co, Ni, Cu, W and Zr; and
   a second binder including at least one of nitride, carbide, carbonitride, oxide, and boride of Al, Cr, Si, Ta, and Nb.

2. The polycrystalline cubic boron nitride (PCBN) of claim 1, wherein the polycrystalline cubic boron nitride contains at least one kind of a compound composed of at least two selected from a group consisting of BN, Ti, W, Co, Zr, and Si, wherein the compound is formed during sintering.

3. The polycrystalline cubic boron nitride (PCBN) of claim 1, wherein the cubic boron nitride particles include boride as a composition and is configured to release the boride to form the at least one protrusion shaped boride by a surface treatment.

4. The polycrystalline cubic boron nitride (PCBN) of claim 3, wherein the surface treatment of the cubic boron nitride particles is performed by at least one of a plasma surface treatment, a thermal treatment, an acid treatment, a sputtering, and a sol-gel method.

* * * * *